United States Patent [19]

Lindh

[11] 4,152,925

[45] May 8, 1979

[54] DEVICE FOR DETECTING LEAKAGE IN HYDRAULIC SYSTEMS

[75] Inventor: K. Gösta Lindh, Sollentuna, Sweden

[73] Assignee: Atlas Copco Aktiebolag, Nacka, Sweden

[21] Appl. No.: 855,939

[22] Filed: Nov. 30, 1977

[30] Foreign Application Priority Data

Dec. 14, 1976 [SE] Sweden .............................. 7614016

[51] Int. Cl.$^2$ .............................................. G01M 3/28
[52] U.S. Cl. .................................... 73/40.5 R; 73/196
[58] Field of Search ................ 73/40, 40.5 R, 194 R, 73/194 E, 194 M, 195, 196; 340/242

[56] References Cited

U.S. PATENT DOCUMENTS

| | | | |
|---|---|---|---|
| 3,425,278 | 2/1969 | Buzza | 73/196 X |
| 3,505,513 | 4/1970 | Fowler et al. | 73/196 X |
| 3,525,259 | 8/1970 | Stough | 73/196 |
| 3,664,357 | 5/1972 | Kreiss | 73/196 UX |
| 3,695,094 | 10/1972 | Hulme | 73/40.5 R |
| 3,711,689 | 1/1973 | Park | 73/40.5 R X |
| 3,723,987 | 3/1973 | Barone, Jr. et al. | 73/196 X |
| 3,970,097 | 7/1976 | Voellmy et al. | 73/194 R X |
| 3,987,662 | 10/1976 | Hara et al. | 73/40.5 R |

Primary Examiner—John Petrakes
Attorney, Agent, or Firm—Flynn & Frishauf

[57] ABSTRACT

A hydraulic system is supervised in order to detect leakage by comparing the flows in two conduits of a hydraulic power consumer. Rotatable flow sensitive means are mounted in each of the conduits. Means are provided to indicate the change of the rotational speed of at least one of the flow sensitive means caused by leakage in the hydraulic system.

14 Claims, 4 Drawing Figures

DEVICE FOR DETECTING LEAKAGE IN HYDRAULIC SYSTEMS

This invention relates to a device for supervising the flow in hydraulic systems in order to detect leakage which occurs for example when a hose breaks.

More precisely, the invention relates to a device which is adapted to compare the flows in two conduits of a power consumer, such as a hydraulic motor.

The invention seeks to provide an indicator of hose breakage which works independently of wide variations of the flow and the working pressure.

The invention is described in detail in the following description with reference to the accompanying drawings in which three embodiments are shown by way of example. It is to be understood that these embodiments are only illustrative of the invention and that various modifications thereof may be made within the scope of the claims following hereinafter.

DETAILED DESCRIPTION OF ILLUSTRATED EMBODIMENTS

Figure 1:
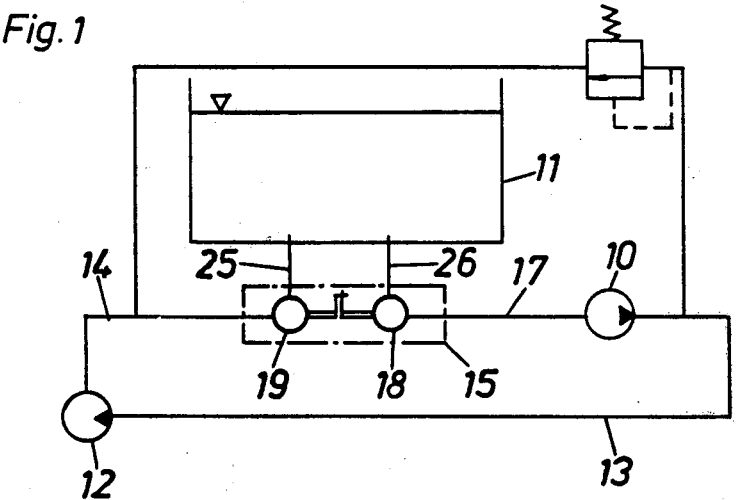
FIG. 1 shows diagrammatically a hydraulic circuit including one embodiment of a device according to the invention.

Corresponding details have been given the same reference numeral in the various figures.

The hydraulic circuit shown in FIG. 1 comprises a pump 10 which is adapted to supply hydraulic fluid to a motor 12 from a tank 11 through a supply conduit 13. Normally, the hydraulic fluid returns to the tank 11 through a return conduit 14.

A device for supervising the flow is generally depicted with the reference numeral 15 and comprises a rotatable flow sentitive means 18 connected to the tank 11 via a conduit 26 and to the pump 10 via its feed conduit 17. In the illustrated embodiment the flow sensitive means 18 comprises an impeller which is attached to a rotatable shaft 20. That means that the shaft 20 rotates slower than the theoretical rotational speed which is defined by the flow and the pitch or capacity of the impeller, due to so-called slip. It is to be understood that by pitch of the impeller is meant the volume which would pass the impeller during one revolution thereof if the impeller worked in a solid.

Figure 3:
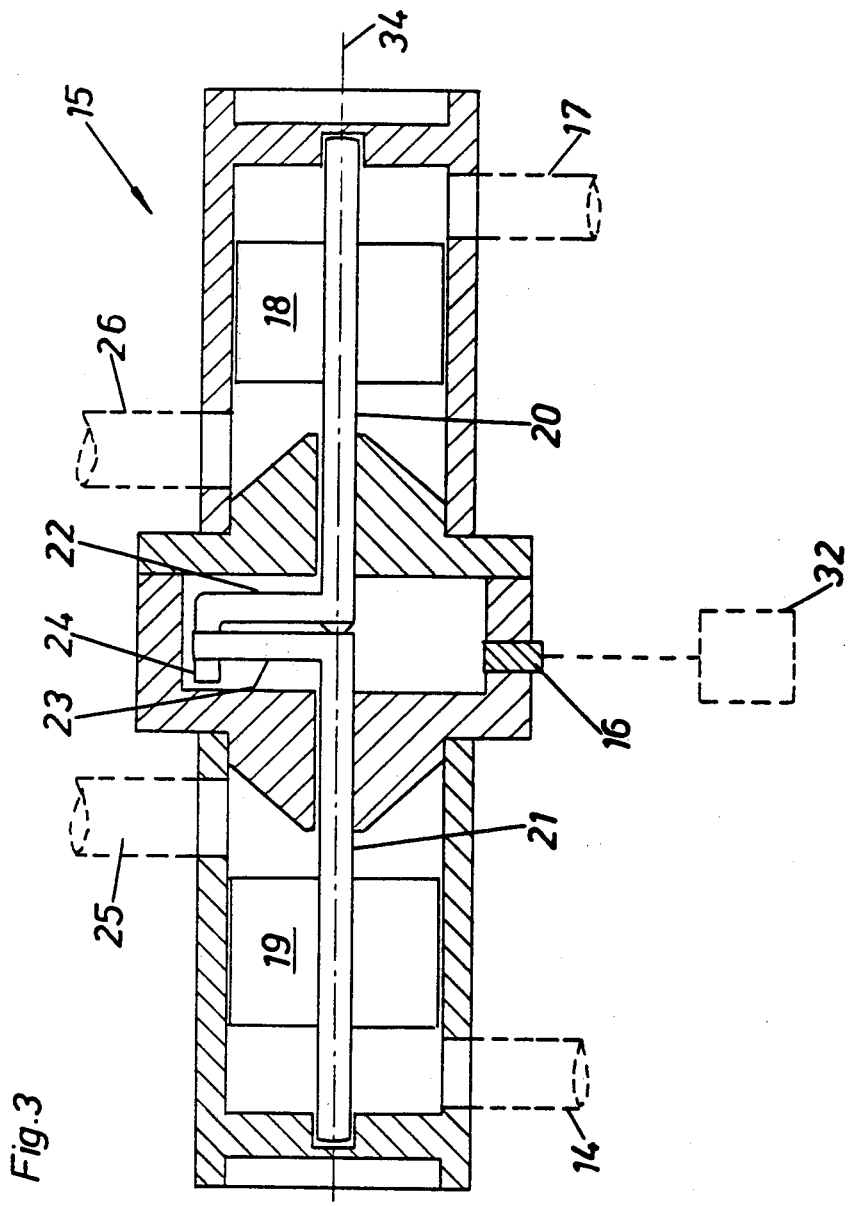
FIG. 3 shows in section the flow supervising device in FIG. 1.

A flow sensitive means 19, in the illustrated embodiment also comprising an impeller, is attached to a rotatable shaft 21 (FIG. 3). The impeller 19 is inserted in the return conduit 14 in such way that return fluid from the motor 12 is conducted through the impeller 19 to the tank 11 via a conduit 25. The impellers 18, 19 rotate about a common axis 34 (FIG. 3).

The pitch of the impeller 18 is larger than that of the impeller 19. This means that normally, i.e. during leak-proof conditions, the impeller 19 transmits a positive torque to the impeller 18. The torque is transmitted by means of bars 22, 23 and a latch rod 24. The bars 22, 23 project substantially perpendicular to the shafts 20, 21.

When leakage occurs in the supply or return conduit, for example caused by a breakage of a hose, then the fluid flow through the impeller 19 will decrease. If the flow decreases by an amount exceeding that which corresponds to the difference between the capacity of the impellers 18, 19, the sign of the torque is reversed, i.e. the impeller 18 now transmits positive torque to the impeller 19. Upon such a reversal of the sign of the torque, the shaft 20 is turned almost one revolution relative to the shaft 21 until the latch rod 24 abuts the rear side of the bar 23. The front side of the bar 23 denotes that side which rests against the latch rod 24 when no leakage occurs; see FIG. 3.

The sign of the torque is sensed by means of an inductive sensor 16 which transmits an impulse which indicates the mutual position of the latch rod 24 and the bar 23. An impulse from the sensor 16 is fed to a control means 32 which when leakage occurs is adapted in a way known per se to either stop the pump 10 or initiate a diversion of the hydraulic flow past the motor 12 back to the tank 11 through a not shown by-pass passage.

Figure 2:
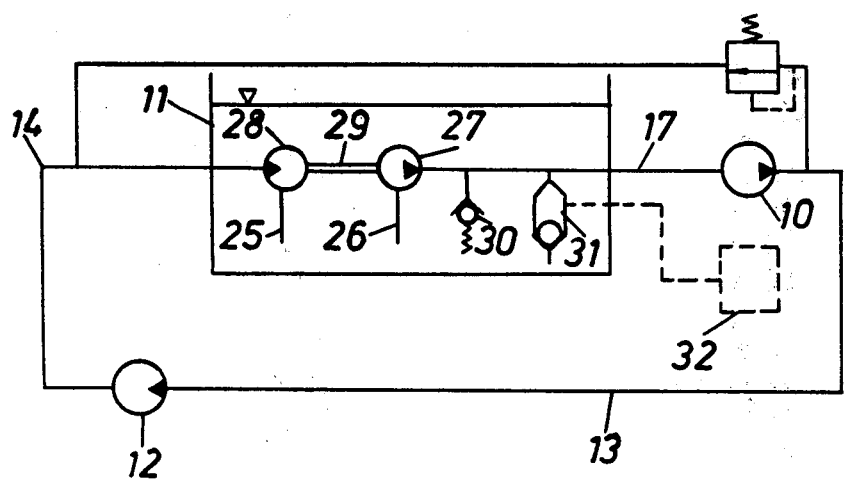
FIG. 2 shows diagrammatically a hydraulic circuit including another embodiment of a device according to the invention.

In the embodiment shown in FIG. 2 the flow sensitive means are hydraulic machines 28, 27 of the pump-/motor type. The displacement or capacity of the hydraulic machine 27 is larger than the displacement of the hydraulic machine 28 which means that normally a positive torque is transmitted from the machine 28 to the machine 27 over a shaft 29. The hydraulic machine 27, thus, supplies more fluid than what is required by the pump 10, thereby causing a feed pressure to arise. The excess flow is conducted back to the tank 11 through a check valve 30. When leakage arises, the feed pressure will decrease and when the leakage flow exceeds a certain amount a negative pressure arises. Such negative pressure can be indicated by means of a valve 31, for example inductively. An impulse from the valve 31 is fed to the control means 32.

Alternatively, the flow supervising device may be mounted outside the tank 11 as shown in FIG. 1, or inside same as shown in FIG. 2.

Figure 4:
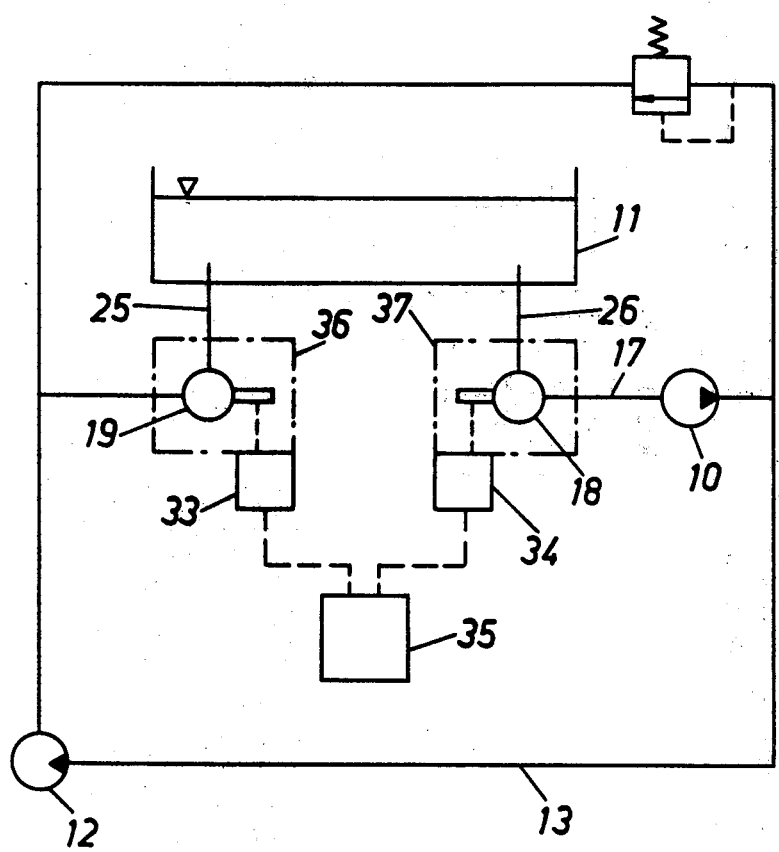
FIG. 4 shows diagrammatically a hydraulic circuit including a further embodiment of a device according to the invention.

In the flow-supervising devices shown in FIGS. 1 and 2, the flow sensitive means are mounted in a common housing. In the embodiment illustrated in FIG. 4 the flow-supervising device comprises two separate units 36, 37. Revolution indicators 33, 34, for example inductive indicators are connected to the units 36, 37 in order to register the number of revolutions of the impellers 18, 19. The signals from the revolution indicators 33, 34 are compared in a comparator 35. The ratio between the number of revolutions of the impellers 18, 19 changes when leakage occurs. The comparator 35, then, generates a signal, thereby either causing the pump 10 to stop or initiating a diversion of the hydraulic flow past the motor 12 back to the tank 11.

The invention can of course also be used to detect leakage in a drain conduit in case such conduit is present.

What I claim is:

1. A device for supervising the fluid flow in hydraulic systems in order to detect fluid leakage, for example caused by breakage of a hose in a supply conduit (13) or a drain conduit of a hydraulic power consumer, comprising:
   a first rotating flow sensitive means (19; 28) in a first conduit of said hydraulic power consumer,
   a second rotating flow sensitive means (18; 27) in a second conduit of said hydraulic power consumer, said first and second flow sensitive means being operatively connected to each other and having different capacities, and means (16, 32; 31, 32) coupled to said first and second flow sensitive means for detecting at least a change in the direction of torque imparted to said first flow sensitive means relative to said second flow sensitive means caused by changes in fluid flow due to leakage in the hydraulic system.

2. A device according to claim 1, wherein said hydraulic system includes a return conduit (14), said first flow sensitive means is mounted in said return conduit (14), and said second flow sensitive means is mounted in said supply conduit (13), said first flow sensitive means having a smaller capacity than said second flow sensitive means.

3. A device according to claim 2, wherein rotation of said first flow sensitive means (19; 28) normally transmits a positive torque to said second flow sensitive means (18; 27).

4. A device according to claim 1, wherein rotation of said first flow sensitive means (19; 28) normally transmits a positive torque to said second flow sensitive means (18; 27).

5. A device according to claim 4, wherein said first flow sensitive means (19; 28) transmits a negative torque to said second flow sensitive means (18; 27) when leakage occurs in at least one of said supply and drain conduits.

6. A device according to claim 5, wherein said first and second flow sensitive means (18; 19) are arranged to be rotatable about a common axis (34).

7. A device according to claim 6, wherein said first and second flow sensitive means (18, 19) are arranged to be turned mutually upon a reverse of the sign of the torque.

8. A device according to claim 7, comprising first and second rotatable shafts (21, 20), and wherein said first flow sensitive means (19) is firmly attached to said first rotatable shaft (21), and said second flow sensitive means (18) is firmly attached to said second rotatable shaft (20), said first and second rotatable shafts being substantially coaxial, and comprising limiting means for limiting the mutual turning of said shafts of said flow sensitive means (18, 19), said limiting means including bars (22, 23) on said first (21) and second (20) shafts, said bars projecting substantially perpendicularly to said first and second shafts.

9. A device according to claim 8, wherein said detecting means comprises sensor means (16) for sensing the mutual position of said bars (22, 23) and for delivering an impulse which indicates the sign of the torque transmitted by one of said flow sensitive means to the other of said flow sensitive means.

10. A device according to claim 9, comprising a control means (32) connected to said sensor means, said control means being adapted to stop the fluid flow through a portion of the system where leakage has occurred upon receiving an impulse from said sensor means.

11. A device according to claim 4, wherein said first flow sensitive means comprises a first hydraulic machine (28), and said second flow sensitive means comprises a second hydraulic machine (27) in the feed conduit (17) of a hydraulic pump (10), and wherein the displacement of said second hydraulic machine is larger than the displacement of said first hydraulic machine.

12. A device according to claim 11, wherein said detector means comprises means (31, 32) for indicating leakage flow, said leakage indicating means being connected to said feed conduit between said second hydraulic machine and said hydraulic pump.

13. A device according to claim 12, wherein said leakage indicating means includes a valve means (31) connected to said feed conduit, said valve means being closed normally by the pressure in said feed conduit and adapted to open when a predetermined leakage flow arises.

14. A device according to claim 1, wherein said first and second rotating flow sensitive means are arranged to be rotatable about a common axis (34).

* * * * *